United States Patent [19]

Hall

[11] 3,812,531

[45] May 21, 1974

[54] VERIFYING STATUS WHILE INITIALIZING READBACK CHANNELS IN A MULTICHANNEL MAGNETIC RECORD READBACK SYSTEM

[75] Inventor: Phil H. Hall, Longmont, Colo.

[73] Assignee: International Business Machines Corporation, Armonk, N.Y.

[22] Filed: Dec. 26, 1972

[21] Appl. No.: 317,987

[52] U.S. Cl. ............................... 360/26, 360/53

[51] Int. Cl. ............................................ G11b 5/02

[58] Field of Search......... 340/174.1 B, 174.1 H, 146.1 F

[56] References Cited

UNITED STATES PATENTS

| | | | |
|---|---|---|---|
| 3,643,243 | 2/1972 | Johnson et al. | 340/174.1 B |
| 3,702,996 | 11/1972 | Wolfer et al. | 340/174.1 B |
| 3,154,762 | 10/1964 | Morpher, Jr. | 340/174.1 B |
| 3,439,331 | 4/1969 | Brown et al. | 340/174.1 B |
| 3,456,237 | 7/1969 | Collins | 340/174.1 B |

*Primary Examiner*—Vincent P. Canney
*Attorney, Agent, or Firm*—Herbert F. Somermeyer

[57] ABSTRACT

In starting to read a digital magnetic record of the multichannel self-clocking type, comparison circuits monitor deskewing apparatus for determining whether or not any of the channels have had an early start or no start of operation. After any channel has processed a predetermined number of bits within a data field and no deskewed data has been transferred, a test skew operation determines whether one or a small number of channels is in a marginal or almost-excessive skew condition with respect to all of the other channels. If such is the case, that small number of channels is deadtracked for enabling the readback system to read the record and transfer signals while deadtracking such few channels. The system is preferably employed with so-called "on-the-fly" error corrections.

8 Claims, 5 Drawing Figures

VERIFYING STATUS WHILE INITIALIZING READBACK CHANNELS IN A MULTICHANNEL MAGNETIC RECORD READBACK SYSTEM

DOCUMENTS INCORPORATED BY REFERENCE

Irwin U.S. Pat. No. 3,623,004, digital signal readback deskewing and buffering.

Andresen et al U.S. Pat. No. 3,670,304, a digital recorder.

Hinz, Jr., U.S. Pat. No. 3,639,900, a digital signal readback system.

Morphet U.S. Pat. No. 3,154,762, excessive skew detection.

Floros Re. 25,527, deskewing apparatus (SKB).

Miller U.S. Pat. No. 3,262,097, deadtracking a digital recorder readback channel.

Irwin U.S. Pat. No. 3,641,534, a digital recorder readback system ('534).

Irwin U.S. Pat. No. 3,654,617, an I/O controller ('617).

Vermeulen U.S. Pat. No. 3,548,327, a digital data detector.

Moyer et al, U.S. Pat. No. 3,303,476, an I/O controller to channel connection.

BACKGROUND OF THE INVENTION

The use of self-clocking channels in multitrack tape systems is quite widely known and used. Among the many advantages afforded by such systems is the possibility of higher densities of recording. Such higher densities not only reduce the length of media required to record a given number of data sets, but also increases the throughput of the record system. Self-clocking, in addition, has been found to increase the reliability of magnetic digital recording systems. Even with the increased reliability, certain problems involved during the readback have been recurrent. It is also expected that as the densities continue to increase, these problems will become more severe and more prevalent. Such problems include the so-called start-up problems which occur upon the onset of detecting a recorded data field. One record block includes data fields bracketed by synchronization signals termed preambles and postambles. Each such record block is separated from other record blocks by gaps having no signals recorded therein (erased portions of media). Each time a record block is to be sensed, the self-clocking readback channels are synchronized or initialized to the recorded signals while scanning either the postamble or preamble. For example, in PE (phase-encoded recording) a string of 40 0's constitutes the preamble and postamble bracketing each phase-encoded data field. Other recording schemes have other forms of synchronization bursts. Even though each readback channel is receiving signals from the respective tracks, during such initialization, there is no information readily available in the readback system as to the operational status of the respective readback circuits. Usually, such status is not determined until some time after the data field has been entered.

During initialization of the readback channels, a problem arises with respect to the deskewing capability of the system; that is, each of the channels asynchronously supplies readback signals to a deskewing apparatus which aligns the received signals for transmittal to a connected CPU (central processing unit). If the skew exceeds the capacity of the deskewing apparatus, a skew error is called; and the record must be re-read. However, during initialization, any one of the channels, which is self-clocked, may interpret a signal perturbation in the synchronization burst as the start of a data field. When this occurs, this is called an early false start. In such a situation, the one track which started early has excessive leading skew. Not only that, but the relationship of the early-started channel is incorrect with respect to the skew of all the other channels. Accordingly, an error condition exists. In previous systems, when such a readback channel started early, a skew error was called after the data field was encountered, requiring a retry or re-read of the record.

Additionally, one or more of the channels may not be successfully synchronized to signals from the respective tracks. Also, the marker signal identifying the beginning of a data field may be missed; and, hence, there may be a late start or no start of a given channel; i.e., it supplies no data signals to the deskewing apparatus. In prior art systems, such a condition resulted in an excessive skew condition resulting in a skew error requiring a retry or re-read of the record.

Such retries or re-reads consume valuable computing time in a data processing system. For example, the entire record area must be traversed by the scanning transducer. The tape must then be stopped and started again in the reverse direction with the record being read a second time. In most data processing systems, such retries require intervention by the CPU thereby detracting from valuable computing time. Accordingly, it is desirable to minimize the number of rereads or retries in any magnetic record system for enhancing effective throughput of the recorder.

Also, for enhancing throughput of digital recorders, "on-the-fly" correction of errors is employed. That is, the errors are corrected during readback and while the media is being scanned. In phase-encoded recording using the ASA Standard format, one TIE (track in error) can be corrected at a time based upon the parity error correction code used. If there are two TIE's then a re-read must be attempted. Such errors or TIE's can occur during initialization which in present-day PE recorders results in a skew error and a retry. In the data field, the on-the-fly correction handles many TIE situations to avoid a retry. With phase-encoded recording having a bit density of 1,600 bits per inch (bpi), initialization problems are infrequent. However, at higher densities where the amplitude of the recorded signal as sensed by the scanning transducer is reduced, initialization problems are accentuated over those encountered with phase-encoded 1,600 bpi (bytes per inch) recording. Additionally, because such higher density recording systems are more error prone, more powerful error detection and correction codes are employed in connection with the magnetic recording. For example, as taught by Hinz, Jr., in his U.S. Pat. No. 3,639,900, two TIE's can be simultaneously corrected using a particular error correction code in connection with quality-indicating signals.

SOME ADVANTAGES OF THE INVENTION

From the above, it is seen that during record initialization as well as during data readback it is very important to determine where the signals from the respective tracks reside in the time domain, one with respect to the other. That is, if the majority of the tracks is leading a few of the tracks, then a potential excessive skew condition will occur only in the lagging direction. On the other hand, if just a few tracks are leading the majority of the tracks, then the track to be deadtracked is the leading track that exceeds the maximum deskewing capability of the deskewing means. By matching these conditions and applying suitable deadtracking criteria, throughput of a readback system for a multitrack digital recorder is enhanced by reducing retries and employing on-the-fly correction for the tracks that are deadtracked initially at the marker signal signifying the beginning of the data field. By preamble related deadtracking, under preamble error conditions, transfer of the first few data bytes is facilitated. Also, in extremely short data records, for example five bytes long, the skew may be greater than the length of the record. Using the technique of the present invention, the capability of recognizing almost-excessive skew before all of the channels have processed the marker signal facilitates reading such short records.

In addition to phase-encoded recordings, other self-clocking systems can be employed in digital magnetic recorders. For example, the system described in the Hinz, Jr., patent, supra, illustrates in Column 2 a storage code approach to NRZI recording which facilitates self-clocking operations. Also, Hinz, Jr., shows correcting more than one TIE on-the-fly. Accordingly, the techniques of Hinz, Jr., are preferably employed in connection with practicing the present invention for providing a greater enhanced digital magnetic recorder.

In other magnetic recording systems, other error correction codes can be used, such as the so-called Fire codes and the like. In such a situation, based upon design considerations of the particular magnetic recording system, more than two TIE's may be simultaneously corrected on-the-fly. For example, three TIE's out of nine tracks could be corrected on-the-fly. The initialization problem of not starting a track and resulting in excessive skew or a skew error being called tends to reduce the throughput of the system even through very powerful error correction codes are being employed for enhancing the throughput as well as reliability and data integrity. By alleviating the initialization problems in combination, particularly with the more powerful error correction codes, a much more reliable magnetic recording system having an enhnaced throughput by the reduction of entries is provided. In such a system, there must be recognition and distinguishment between an early starting or a late starting track which could result in a skew error.

SUMMARY OF THE INVENTION

It is an object of the present invention to provide enhanced initializing media readback apparatus and methods for a multichannel digital signal transfer system. The signal transfer system is preferably operatively associated with a digital magnetic record.

According to the present invention, the improved initializing apparatus includes a plurality of independent, self-clocking readback and detection channels respectively for supplying data signals recovered from record tracks in asynchronous relationship to each and every other channel. Each channel has means for indicating the start of a data signal field. Deskewing means asynchronously receive signals from each of the channels and have independent means for controlling the transfer of signals from the respective channels to registers or storage positions within the deskewing means, together with a common means for reading out aligned signals from the deskewing means. Monitor means are associated with the deskewing means for detecting the difference between any one of the independent means and the common means indications of the location of the last-read-in or last-read-out storage position in the deskewing means. Stepping means in each of the independent means is responsive to a start-of-data signal from the respective channels to step the independent means in accordance with bit periods established by the respective self-clocking channels. Test initiating means are in the absence of successful deskewing operations responsive to the stepping means having stepped a predetermined number of bit periods after each start of data to supply a test-skew signal. Comparison means are responsive to any one of such test-skew signals for comparing the stepping means of all of said independent means and of said common means for indicating the respective deskewing condition with respect to leading and lagging conditions of the respective self-clocking channels. Further, if there is an almost-excessive or marginal skew condition between any of the independent means, then means are provided for deadtracking those few channels that exhibit such excessive skew, whether they are leading or lagging, for enabling transfer of data signals through the deskewing means in the absence of the respective self-clocking means supplying such readback signals. Further, control means are responsive to said common means to read out at least one set of aligned signals to inhibit operation of comparison means.

In the preferred form, detection of a marginal skew condition during initialization indicates that at least one readback channel has processed the predetermined number of bits. A test skew operation is automatically initiated by such detection.

The foregoing and other objects, features, and advantages of the invention will be apparent from the following more particular description of a preferred embodiment of the invention, as illustrated in the accompanying drawing.

THE DRAWING

DETAILED DESCRIPTION

Figure 1:
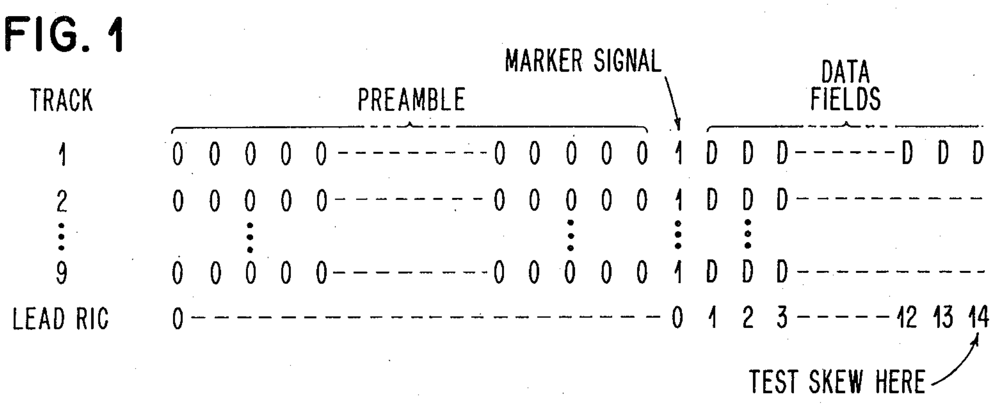
FIG. 1 is a digrammatic showing of a tape record format with an indication of practicing the present invention with such format.

Referring to FIG. 1, the preamble in phase-encoded recording consists of 40 0's in a row. Each of the sensing transducers in a multitrack head supplies such signals to the respective self-clocking readback channels (not shown) for synchronizing the clock or oscillator therein to the frequency of operation of the readback signals. The transition from the last zero to the marker's all-1's byte is represented in phase-encoding by a long wavelength. Detection of this long wavelength triggers the start-data signal signifying the beginning of the respective data signals from the respective record tracks. The first byte occurring after sensing the marker signal in the respective record tracks is lodged into the reference position of the deskewing apparatus as taught in Floros Re. 25,527. It should be remembered that each of the readback channels, as will be described, asynchronously supplies the respective data signals from the respective record tracks to the deskewing apparatus. For example, track 2 may be the first to supply data signals to deskewing apparatus. As such, it is the "leading track." (The term "track" when used in this context includes the record or data track on the media and associated readback channel circuits.) On the other hand, track 9 may be the last to supply signals to the deskewing apparatus and thereby is denominated the "most-lagging track." FIG. 1 shows data in an idealized no-skew condition, it being understood that the signals from the various tracks are usually substantially perturbated in time.

When the most-leading track, for example, track 2, has supplied 14 data bits from its record track to the deskewing apparatus, and no group of signals has been deskewed, a test-skew signal is generated as later described. Comparison means are then employed, as will be described, comparing the relative position in the deskewing apparatus of all of the signals from all of the tracks. If a majority of the track signals is in a leading position, that is, a minority of the track signals is lagging, then those few lagging track signals are selectively deadtracked for facilitating readback of the data field. On the other hand, the most-leading track signal may be the only signal that is leading; and all of the other track signals are in a group within the deskewing capability of the deskewing apparatus. As such, the leading track signal is selectively deadtracked; and the signals from all the other tracks will be processed with on-the-fly correction substituting signals for the deadtracked readback channel.

In some instances, for example, in phase-encoded recording, only one track can be deadtracked at a time and still facilitate on-the-fly correction. Accordingly, if six of the nine tracks are leading, and three of the tracks are lagging more than the permissible amount, a skew error is indicated. A read retry is then required, as is well known. The present look-ahead for deadtrack evaluation reduces retries by facilitating an early determination of error correction requirements.

READBACK CIRCUITS — GENERAL ARRANGEMENT

Figure 2:
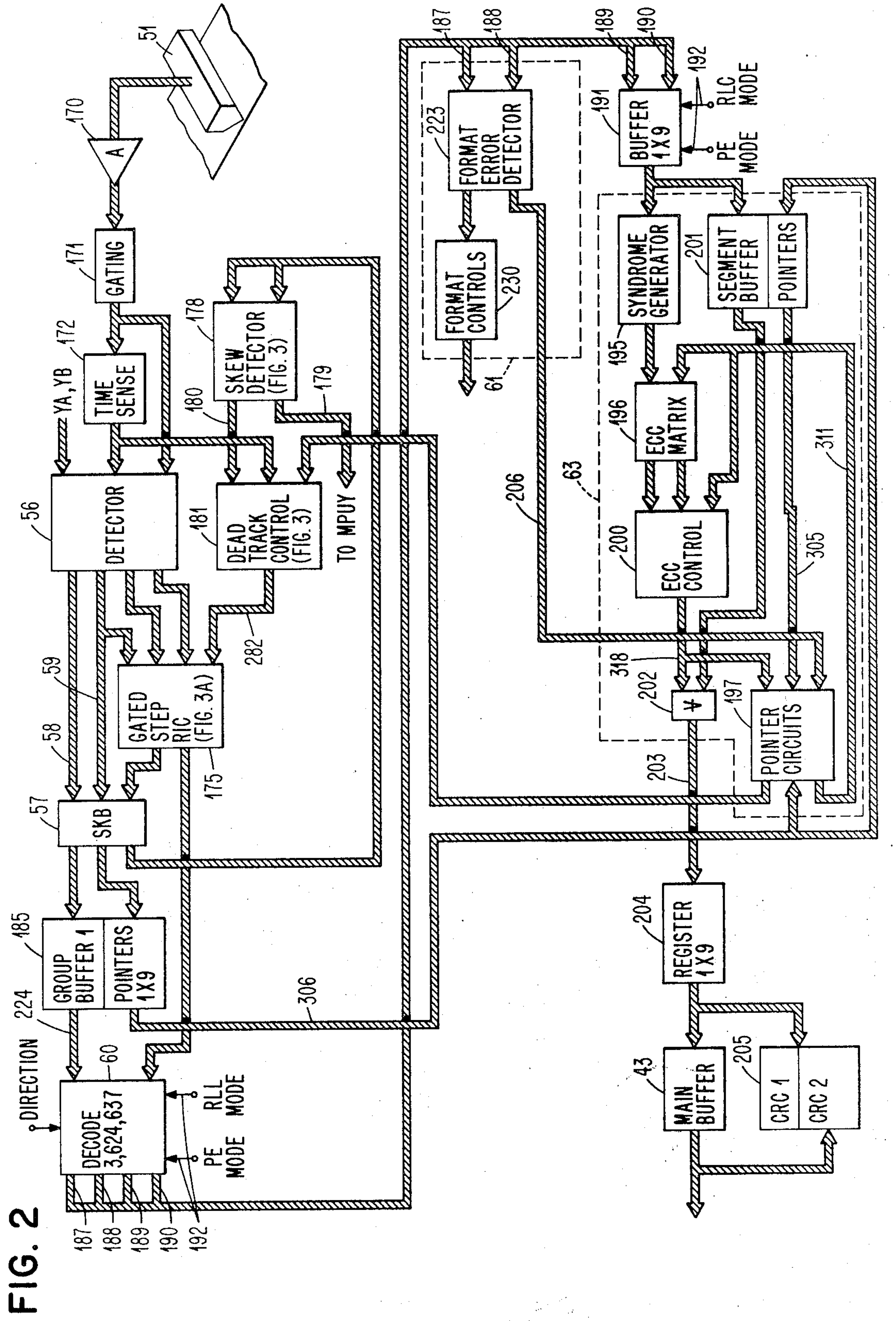
FIG. 2 is a simplified logic diagram of a readback system for a multitrack magnetic recording system which may employ the present invention.

Referring now more particularly to FIG. 2, the general logic arrangement of a readback system is described. Multitrack head 51 senses recorded signals on media M.

From transducer assembly or head 51, a plurality of low-level signals are amplified by linear amplifiers 170, one for each of the nine tracks in a ½ inch tape system. The amplified signals received by gating circuits 171 are sensed for appropriate amplitude and then gated as hard-limited signals to time-sense circuits 172 and detector 56. The operation of circuits 171 and 172 is shown by Andresen et al in U.S. Pat. No. 3,670,304. Detector 56 corresponds to data detector 28 of that referenced patent application and is controlled in a similar manner. In addition, detector 56 selects between NRZI, PE, and run-length limited (RLL) coded (Hinz, Jr., RLL storage code, supra) detection in accordance with microprogram signals YA, YB (not shown), received from microprocessor 38 in accordance with Irwin U.S. Pat. No. 3,654,617. Detector 56 can be constructed in accordance with Vermeulen U.S. Pat. No. 3,548,327.

Detected 1's data travels over cable 58 to deskewing registers (SKB) 57. For each of the nine tracks, there is also a single line in cable 59 transferring pointer signals or quality signals to be deskewed in SKB 57 along with the data signals. Using the afore-described RLL coding, there will be 5 bit positions for each code group or value and a bit position for the quality signal associated with that code value as detected by detector 56. Such quality signals are those described by Hinz, Jr., U.S. Pat. No. 3,639,900 and also described by Cannon in his article, "Enhanced Error Correction," IBM TECHNICAL DISCLOSURE BULLETIN, Volume 14, Number 4, September 1971, Pages 1171 and 1172. SKB 57 deskews the data and pointers bits as shown in Irwin U.S. Pat. No. 3,623,004 for self-clocking systems (PE and RLL) as well as for NRZI systems.

During the initial portion of reading a record from a magnetic tape, the preamble is first read and detected, but not forwarded through SKB 57. To detect that a preamble is coming to an end, gated-step-RIC (read-in counter) circuit 175 is responsive to a string of ten 1's in any of the tracks to initiate SKB 57 operation. For PE, detection of a long wavelength (not shown) supplies the same signal to SKB 57. Detected data start marker signals are inserted in the respective deskewing buffers for use by format circuits 61. The present invention enhances operation of this portion of the readback system as described in more detail with respect to FIGS. 3 and 4.

Figure 3:
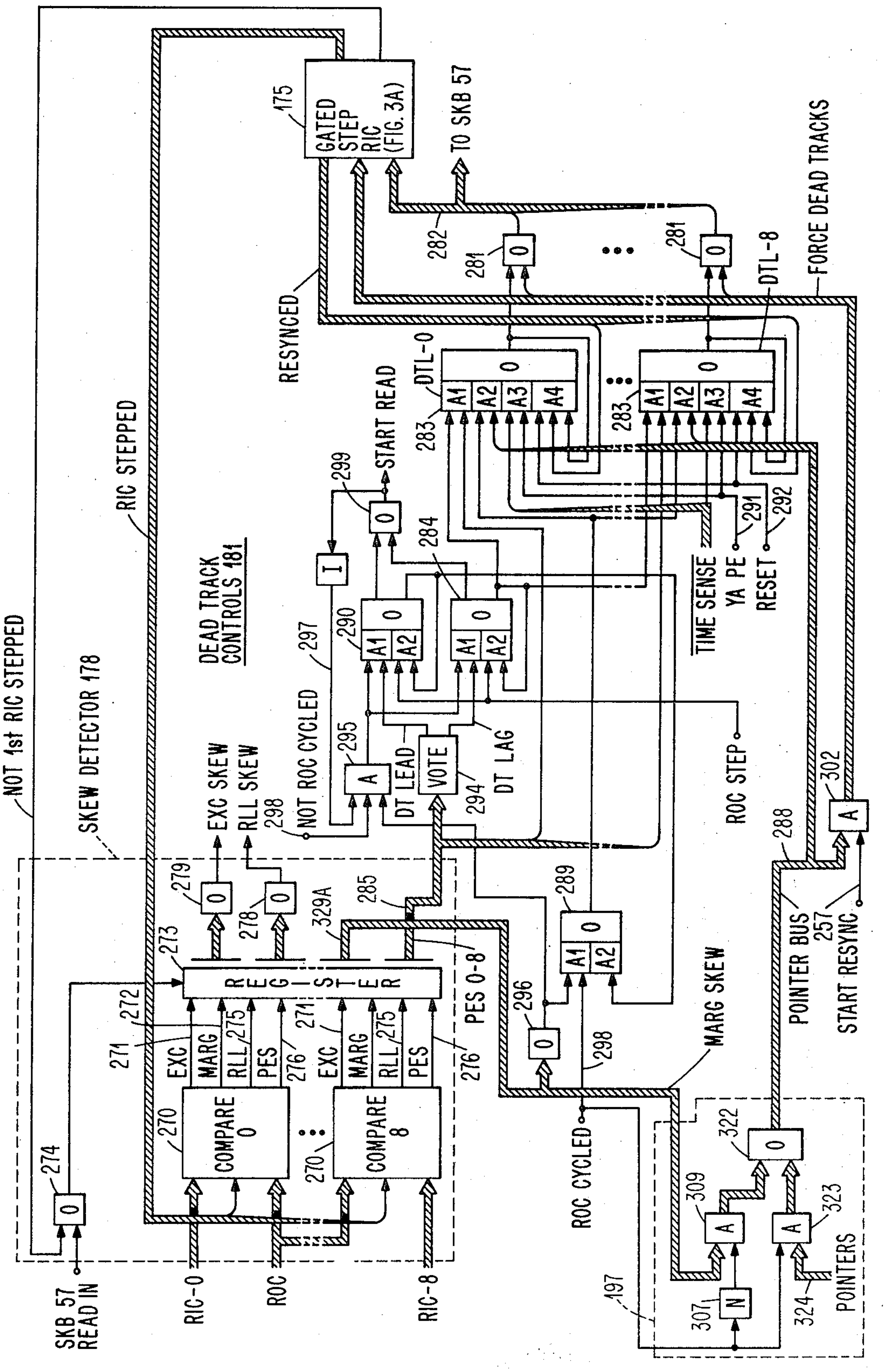
FIG. 3 is an abbreviated logic block diagram of circuitry usable with the FIG. 2 illustrated apparatus for implementing the invention therein.

SKB 57 cooperates with skew detector 178 to detect excessive skew as defined and taught by Morphet U.S. Pat. No. 3,154,762 and as referenced in FIG. 3. The Morphet teaching applies to phase-encoded readback and to RLL readback. Upon detection of excessive skew, detector 178 supplies sense data over cable 179 to MPUY (not shown) in accordance with Irwin '617. Additionally, excessive skew signals are supplied over cable 180 to deadtrack control 181 for initiating deadtracking as shown in FIG. 3 and as generally taught by Miller U.S. Pat. No. 3,262,097. Deadtrack control 181 supplies deadtrack signals to circuits 175 to block transfer of data signals read from a deadtrack. Examination of FIG. 3 will show that skew detector 178 also supplies almost-excessive skew signals in connection with error correction and detection as will be explained later.

SKB 57 deskews the RLL and PE data in accordance with known deskewing techniques. When one byte of data bits has been assembled in each of the nine tracks, a readout cycle is initiated in SKB 57. A first set of buffers, group buffer 1, GB-1 185, receives one group (five bytes) of deskewed storage coded signals and associated quality signals, or hardward pointers, from SKB 57. Each time GB-1 185 is not full, it sends a request to SKB 57 for a transfer of one such byte. SKB 57 automatically responds to fill GB-1 185 in accordance with known data signal transferring techniques. It should be noted that the transfers between SKB 57 and GB-1 are independent of all other transfers in the readback system. It only requires that GB-1 be empty and SKB 57 has assembled and deskewed one group of storage coded signals.

The storage coded signals are then converted from the RLL storage code format to 4-bit data processing coded groups, which may include check bits. GB-1, when full, supplies one group of signals from each of the nine tracks to decode 60. Decode 60 has one decoder for each of the nine tracks conveniently constructed in accordance with Irwin U.S. Pat. No. 3,624,637. Decode 60 has four groups of outputs. First are the detected format markers (not shown) supplies over cable 187 to format circuits 61. Second cable 188 transfers signals indicating that an illegal RLL code value has been decoded. This nine signal path cable connects to format detector 61 and eventually provides error signal pointers to read circuits 63. The other two cables 189 and 190 carry decoded data from either the RLL or PE recordings through single-byte buffer 191. The cable is selected in accordance with the control signals received over lines 192 from microprocessor 38. In the RLL mode, the decoded bytes are serially transferred through cable 189 as four byte signal groups.

The detected and decoded format groups result in control signals from format circuits 61. The decoded data transferred through buffer 191 is then error corrected by read circuits 63. Buffer 191 supplies the decoded data on a byte-by-byte basis for each group to syndrome generator 195 which generates S1 and S2 error-indicating syndromes. ECC matrices 196 jointly respond to the S1 and S2 syndromes, plus the data and pointers from pointer circuits 197, to generate error-pointing patterns for ECC control 200. The decoded data from buffer 191 also is transferred through segment buffer 201 and is stored there during the error detection and correction operations of syndrome generator 195, ECC matrices 196, and ECC control 200. Exclusive-OR circuits 202, one circuit for each track, are jointly responsive to the error patterns from ECC control 200 and the data synchronously supplied from group buffer 201 to supply correct data signals over cable 302 to ECC output byte buffer register 204. Sequence controls (not shown) request seven consecutive write cycles from main buffer 43. At this time, segment buffer 201 and ECC control serially and synchronously transfer seven bytes of error patterns and data signals through Exclusive-OR's 202 and register 204 to main buffer 43.

Returning now to pointer circuits 197, these circuits receive pointer signals from buffer 201 over cable 305 which resulted from detector 56 operation, from the RLL error detector in circuits 61 over cable 206 which indicate an illegal code value, from ECC control 200 indicating that a particular track has been corrected, plus GB-1 185. Based upon these inputs, pointer circuits 197 generate categories of pointers useful in error detection and correction as well as in deadtrack control. Generally speaking, pointer circuits 197 establish hierarchies of quality or pointer signals which, when positively indicating an error, are supplied as such to ECC matrix 196. If an error condition persists, a persistent pointer is generated and supplied to deadtrack control 181. In some instances, detector 56 generates pointer errors supplied over cable 59 and thence transferred to buffer 201. This may indicate a possible error condition with detector 56 correctly detecting the data. In such a case, pointer circuits 197 memorize that a pointer has been generated; such pointers are ignored by circuits 196, 200 until an error condition has been verified.

In accordance with the present invention, operation of the FIG. 2 illustrated readback system is enhanced by incorporating the methods and apparatus shown and described with respect to FIG. 3. In particular, skew detector 178, in combination with dead-track control 181, cooperates in controlling detector 56 and gated-step-RIC circuit 175 during the initialization process of reading each recorded record block to enhance the throughput of the system by identifying readback circuits supplying poor-quality signals or having an improper start operation. Key to the operation is the early skew detection during a first phase portion of the skew detector 178 operation which occurs during initialization. Skew detector 178 continues to monitor skew during the second phase—the data readback phase. Another important aspect of the invention is the smooth transition from phase 1 to phase 2 of the skew detector operation. Deadtrack control 181 responds to skew detector 178 generated signals to selectively dead-track detector 56 and the associated readback circuits in accordance with the Miller patent, supra.

SKEW DETECTION

Skew detector 178 and deadtrack initiation by deadtrack control 181 operate in the asynchronous portion of the readback system, that is, before synchronous transferring on a deskewed signal group basis from SKB 57. Each signal transfer in the respective track or readback channel portions is timed by the readback signal via the clocking signals generated by detector 56. Such generation is well known and not further described for that reason.

Skew detector 178 detects skew by comparing SKB 57 RIC (read-in counter) and ROC (read-out counter) tallies as generally described in the Morphet U.S. Pat. No. 3,154,762. Excessive skew is detected in accordance with that patent. In this regard, compare circuits 270, one for each track, compare the RIC and ROC counts of SKB 57 to detect excessive skew (EXC) for RLL readback as respectively indicated on lines 271. Excessive skew is determined in accordance with the capability of SKB 57; for example, excessive skew may be defined as a skew of three groups of data signals—that is, the most-leading track would be three groups of data signals ahead timewise of the most-lagging track signal.

Similarly, lines 275 respectively carry an excessive skew indication for readback of phase-encoded (PE) signals which is also used during recording RLL or PE to detect excessive write skew. That is, during read-after-write recording verification, comparators 270 monitor skew and supply a skew check signal via OR 278 to microprocessor 38. Similarly, excessive RLL readback skew travels through OR 279 to microprocessor 38 as an RLL read skew check signal. Also, lines 276 carry signals indicating excessive write skew for phase-encoded recording. The signals on line 276 also travel over cable 285 for deadtrack determination, as will be described.

As an example of the skew magnitudes involved, excessive RLL read skew (lines 271) may be three groups or thirty record frames or bytes. The marginal RLL readback skew may be at least 25–27 record frames. Lines 275 are activated during RLL recording when the associated RIC leads ROC (most-lagging RIC or readback signal) by 14 data frames. Similarly, lines 276 are during PE readout activated when the associated RIC leads ROC by four or more record frames. The latter number is selected to provide compatibility with the information interchange standard on phase-encoded recording. Based upon the above and following descriptions, it will be seen that the detected skew relationships are used to control errors during readback and recording in accordance with the record format of the media, as well as the portion (synchronization or data) of the signal record currently being processed.

Additionally, there are two phases of skew detection. The first or initializing phase occurs during readback of a preamble or postamble and initial portion of data signal readback, and the second phase occurs during data readback. Phase one extends from detection of beginning of record (end of erased gap between records) until just after the marker signal of the lagging track signal. The latter follows the Morphet patent teaching while also detailing almost-excessive skew for greater reliability, while the former is an added feature to the described system. These two phases are used during readback of data signals and during read-after-write to verify a proper recording operation.

In addition to detecting excessive skew, compare circuits 270 also detect and indicate marginal or almost-excessive skew. Marginal skew indication selectively activates deadtracking during the first phase operation, as will become apparent. By dead-tracking before excessive skew (error condition) a retry may be avoided. Removing a possible TIE from the deskewing queue facilitates on-the-fly error correction. In the illustrated embodiment, almost-excessive skew can be two groups of RLL encoded data between the most-leading track signal and the most-lagging track signal. When such almost-excessive skew exists between any RIC and ROC, an almost-excessive or marginal skew (MARG) travels over lines 272, respectively. These skew-indicating signals are temporarily stored in register 273, one bit position being established respectively for each track's indication of excessive (one bit) and marginal (one bit) skew, respectively, to digit positions in register 273. During the first phase of operation, i.e., when the preamble or postamble portion of the record is being read, a continuous signal "not-first-RIC-stepped" from circuits 175 (later described) travels through OR 274 to maintain register 273 in a signal-receiving state. Register 273 may consist of a plurality of phase-hold latches, with the output signal from OR 274 enabling such phase-hold latches to receive signals. Removal of the signal causes the phase-hold latches to maintain the signal state until a new signal is being received, as is well known. In this manner, during the first phase, the output signals from compares 270 are continuously supplied through registers 273 for use by deadtrack controls 181.

During the second phase of operation, i.e., during data readback, circuit 175 removes the not-first-RIC-stepped signal and turns control of register 273 to a control signal received from SKB 57. In this regard, each time any data readback channel supplies a signal to SKB 57 and that signal has been stored in the deskewing registers, SKB 57 supplies an "end-read-in cycles" signal through OR 274 to momentarily actuate register 273 to receive the then skew indicating output signals from compare circuits 270. Such signals are then maintained until the next signal is read into SKB 57. Accordingly, during the second phase, register 273 skew indicating signal state is updated each time SKB 57 receives a new signal from any of the readback channels. Generation of the "end-read-in cycle" signal is not described as it forms no essential part of the present invention, and generation of such signals is well known in the art.

DEADTRACK CONTROLS — 181

Deadtrack controls 181 receive the skew information signals from detector 178, as well as gated pointer signals from circuit 197, to determine dead-tracking operations within SKB 57 during both phases in fundamental accordance with Miller U.S. Pat. No. 3,262,097. Controls 181 initiate deadtracking under any one of four conditions as represented by the input signals to the A1, A2, and A3 input AND portions of deadtrack latches (DTL) 283 (one for each track), plus A-O circuit 289. Phase one control of deadtracking depends from the skew of the readback signals during start-up operations, while the remaining conditions are determined during data signal readback. Additionally, limited deadtracking is selectively initiated for resynchronization operations independent of error conditions during data signal readback.

During the first phase, deadtrack control DTL's 283 are selectively set by the DT (deadtrack) lag latch 284 or the DT lead latch 290. During this phase, register 273 is continuously sending the marginal and excessive skew signals to deadtrack controls 181. OR 296 takes any one of the marginal skew signals to active AND 295 for selectively setting either DT lead latch 290 or DT lag latch 284 in accordance with the analysis of skew, indicated by cable 285 signals, by voting circuit 294. These latches then respectively gate deadtrack initiating signals to DTL's 283 in accordance with the then skew conditions indicated by comparators 270. Circuit 249 is constructed in accordance with the Morphet patent, supra. This operational step initiates a determination of whether or not any track is to be deadtracked by setting the associated DTL 283.

Circuit 294 selectively sets DTL's 283 for initiating deadtracking at the onset of data readback during a lagging condition of a few of the tracks via DT lagging tracks latch 284. Circuit 294 supplies a 6/8 lead signal (the term 6/8 lead means that at least 6 or 8 tracks, excluding parity, are leading) to latch 284. A1 portion combines the skew indication signals received over cable 285 from register 273 with the 6/8 track lead signal to activate latch 284. In this instance, DTL's 283 are respectively set by the skew indicators with a lagging condition (those RIC's having tallies closest to the then tally in ROC).

On the other hand, when voting circuit 294 indicates that 6 of the parity) tracks (excluding partiy) are lagging—that is, there are either one or two leading tracks, then the A1 portion of latch 290 responds to that signal, plus the output signal of AND 295. AND 295 output signal signifies that the skew buffer read-out counter (ROC) has not cycled (still reading the preamble), and reading has not started while a marginal skew condition has been detected by one of the compares 270. The active signal of latch 290 goes to A-O 289, as later described, to selectively set DTL's 283 corresponding to the most-leading tracks.

In the preferred form, latches 290 and 284 are sensed, if at all, for skew conditions when the most-leading track has reached the 14th data frame or byte. That is, after reading the marker signal, the most-leading track has already read in 14 bits of data to SKB 57. A marginal skew signal from any track passing through OR 296 when ROC has not cycled signifies that at least one track has been read to the 14th data frame and yet at least one other track has not been read to the end of a preamble marker signal.

Such skew testing is inhibited whenever readout counter of SKB 57 has stepped, i.e., a full group of data bytes has been assembled; such action indicates all readback channels are properly operating, eliminating the need for a skew test. A reset signal then actuates both A2 portions of latches 284 and 290 resetting same. When both latches are reset, the latch reset output signals travel through OR 299 as start read check signal. The inversion of this signal is supplied as an input to AND 295 which gates the setting input to the two DT latches. When ROC has cycled once, it supplies a continuous degating signal over line 298 to AND 295. Therefore, anytime after SKB 57, ROC has cycled; i.e., a full group of data signals has been assembled, phase one skew checking terminates and phase two begins. Such a condition shows successful read out from all tracks.

For phase one deadtrack initiation, the line 276 marginal skew indicator signals are combined with the active output signals of latch 284. The output signal of A-O 289, which is activated by the output signal of DT leading track latch 290, is supplied to the A2 portion of all of the DTL's 283. This signal is combined in the respective A2 portions with the gated pointer signals from pointer circuits 197 to set the DTL's. Track 0 DTL 283 A2 portion combines track 0 pointer bus signal with the skew generated timing or test signals to set that DTL 283. A leading track in error can only be detected by combining the deadtrack leading track latch signal 290 with pointer signals from circuits 197. These pointer signals indicate some type of possible error condition (marginal skew is the preferred form) in the respective leading or lagging tracks.

Pointer circuits 197 include gating apparatus 309, 323, to gate marginal skew signals on cable 329A during phase one, and during phase two other pointer signals (see Hinz, Jr. U.S. Pat. No. 3,639,900) on cable 324 to pointer bus 288. The ROC cycled signal on line 298 is inverted by inverter 307 to open AND's 309 to pass marginal skew indicating signals through OR's 322 to all A2 input portions of DTL's 283. Hence, in phase one, the marginal skew pointer signals are gated by DT lead latch 290 signals (via A-O 289) to initiate deadtracking.

During phase two, AND's 309 are degated while AND's 323 are enabled by the active ROC cycled signal. The Hinz, Jr., type of pointer signals then flow to the respective DTL's 283 A2 input portions. The cable 329A marginal skew indicating signals are combined in OR 296 to supply a deadtrack sampling signal from A-O 289. This sampling signal samples all DTL 283 A2 input portions to pass any active pointer signal on pointer bus 288 to set the corresponding DTL 283.

During the data readback or second phase, DTL's 283 are selectively set either by the A2 or A3 input portions. The A1 input portion of A-O 289, during the data readback portion, selectively receives the ROC cycled signals (a set of deskewed data signals have been supplied by SKB 57) over line 298 from SKB 57. That is, after a group of signals is read from SKB 57, marginal skew conditions are tested each time a signal from any track is read into SKB 57. The output signal of OR 296 indicating marginal skew is gated by the ROC cycled signal through A-O 289 to partially activate all of the A2 input portions of DTL's 283. This signal is combined therein with the pointer signals received over cable 288 from pointer circuits 197.

A3 portions of DTL's 283 initiate dead-tracking during data readback in the PE mode of operation. These circuit portions are jointly responsive to signals from time sensor 172 indicating a predetermined loss of signal envelope level and the PE mode as indicated by microprocessor 38 over line 291 to supply deadtrack initiating signals over cable 282 to SKB 57. For deadtracking, time sensor 172 may indicate loss of energy content, loss of signal amplitude, or a combination thereof of the readback signal. Alternately, pointer signals on cable 288 may activate deadtracking in the PE mode.

Input portions A4 are the reset and hold portions. Each DTL 282 output maintains the latch in its activated state as is well known. Reset signals received over line 292 reset all DTL's 283 upon a resynchronization as effected by the intrarecord resynchronization patent by Irwin, '534, or upon the initiation of reading a record as indicated by microprocessor 38.

Because of recynchronization capabilities of the readback system and the inhibition of deadtracking until at least marginal skew and a pointer signal on cable 288 indicating an extended error condition during readout, limited deadtracking is selectively initiated upon the onset of encountering a resynchronization pattern by the reading transducers. In this regard, AND circuits 302 respond to the start resync signal (see Irwin '534) on line 257 to pass pointer signals traveling over cable 288 to OR circuits 281 for initiating limited deadtracking during the resynchronization portion for facilitating resynchronization of the respective readback circuits in accordance with the Irwin Patent '534. During limited deadtracking, readback signals are processed through SKB 57; the controls shown in FIG. 3 are merely activated to enable resynchronization of such readback channel. This action ensures that a readback circuit almost reaching a mandatory deadtracking situation can be automatically readjusted to proper readin into SKB 57 in accordance with the actual skew and its readback VFC (variable frequency clock) be readjusted by the resynchronization pattern as described in said patent. In this manner, deadtracking is delayed until the last possible moment when a marginally operating readback circuit starts to process resynchronization data. The limited deadtrack initiation makes the VFC of that track responsive to the resynchronization signal thereby enhancing the probability of the circuit automatically adjusting to the proper mode of operation during a resynchronization period.

SKB CONTROL

Figure 3A:
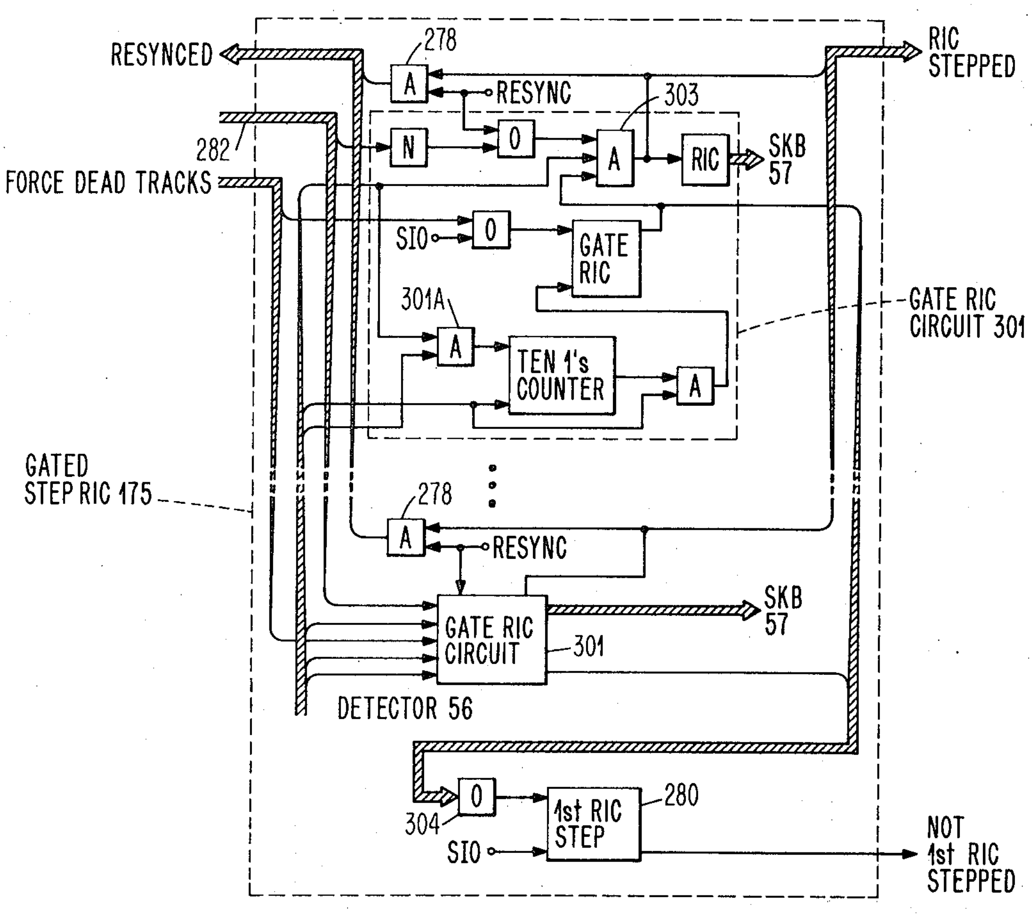
FIG. 3A illustrates a gated step RIC circuit for use with the FIG. 3 illustrated circuitry.

SKB 57 operation is initiated in the gated-step-RIC circuit 175 (FIG. 3A). Output signals from detector 56 supplied to gate-RIC circuits 301 over the 1's line are timed by the detector 56 generated clock signals (not shown) over the clock line to increment the ten-1's counter in each of the respective circuits 301. There is one such circuit for each of the respective readback circuits associated with the various tracks on the media. Each preamble and postamble, as well as resync patterns as previously described, include ten 1's in a row. The ten-1's counter in the respective circuits detects that a so-called mark-1 (read backward) or a so-called mark-2 (read forward) signal, for example, is about to be detected. If, during a clock time, a 0 is supplied, the ten-1's counter is reset ensuring that only ten successive 1's cause it to overflow to set the ten-1's latch in the respective circuits. Each of the circuits 301 operate in accordance with the readback signal frequency in the respective track. Accordingly, the ten-1's latch in the respective circuits 301 may be set at differing times. Upon being set, each of the respective ten-1's latches supply an activating signal to its respective AND circuit 303 for stepping the RIC (read-in counter) of SKB 57 (for convenience shown as being a part of each of the circuits 301). The ten-1's latch also supplies the activating signal through OR circuit 304 to set first-RIC-step latch 280; that is, the first ten-1's latch in any of the circuits 301 becoming active sets the first-RIC-step latch 280. This latch being set supplies an activating signal through OR circuit 274 to enable register 273 to start receiving the output signals from comparators 270, as previously described.

Each AND 303 passes clock pulses derived from the readback signal in a known manner by detector 56 to step each respective RIC for transferring signals into SKB 57 as has previously been referred to. Additionally, the output signals of OR's 281 are inverted and supplied to AND 303 for indicating that the respective track is not being deadtracked. Accordingly, when the respective OR's 281 are supplying a deadtrack indicating signal, the respective AND 303 is disabled preventing the respective RIC from stepping signals into SKB 57. The deadtrack indicating signals are also supplied from cable 282 to SKB 57 to enable the read-out counter (ROC) to step independent of a given RIC being inactivated. Such deadtracking signal also enables read-out from SKB 57 without the signals from a "deadtrack" as shown in Miller, supra.

Circuits 175 are reset each time a start I/O (SIO) signal is presented to the I/O controller by the CPU (not shown). Resetting the circuit merely requires that the first-RIC-step latch 280 and all of the ten-1's latches be reset. The ten-1's counters will be reset by any of the 0's being supplied by detector 56. In this regard, AND 301A is responsive to the not-1 signal and the clock signal to reset the ten-1's counter.

Upon a resynchronization burst being encountered, it will be recalled that a limited deadtrack may be forced by one of the AND's 302. In this regard, the respective OR 281 passes the deadtrack signal to disable AND 303 upon entering the resync burst. The ten-1's counter is responsive to ten 1's in a row in the middle of the resync burst to again set the ten-1's latch, which has previously been reset by the forced deadtrack. Upon receipt from the detector 56 in accordance with the Irwin Patent '534, AND 303 becomes enabled again to pass clock signals for again stepping the respective RIC for passing the mark-2 signals occurring at the end of the resynchronization pattern into SKB 57. Upon resync being established, the deadtrack latches 283 are reset by AND's 278 and as shown in the Irwin patent, supra. In a forced limited deadtrack, SKB 57 may be permitted to receive readback signals from the associated track, and the associated detector 56 portion continues to operate while the error correction circuits accommodate any associated error condition.

During the PE mode, the 40 0's in the preamble or postamble are inverted to 1's to activate the ten-1's counter. Upon detection of the PE marker signal (first long wavelength) and the ten-1's count, the respective RIC's initiate counting. The apparatus for accomplishing this action has been ommitted for brevity.

FLOWCHART OF OPERATIONS

Figure 4:
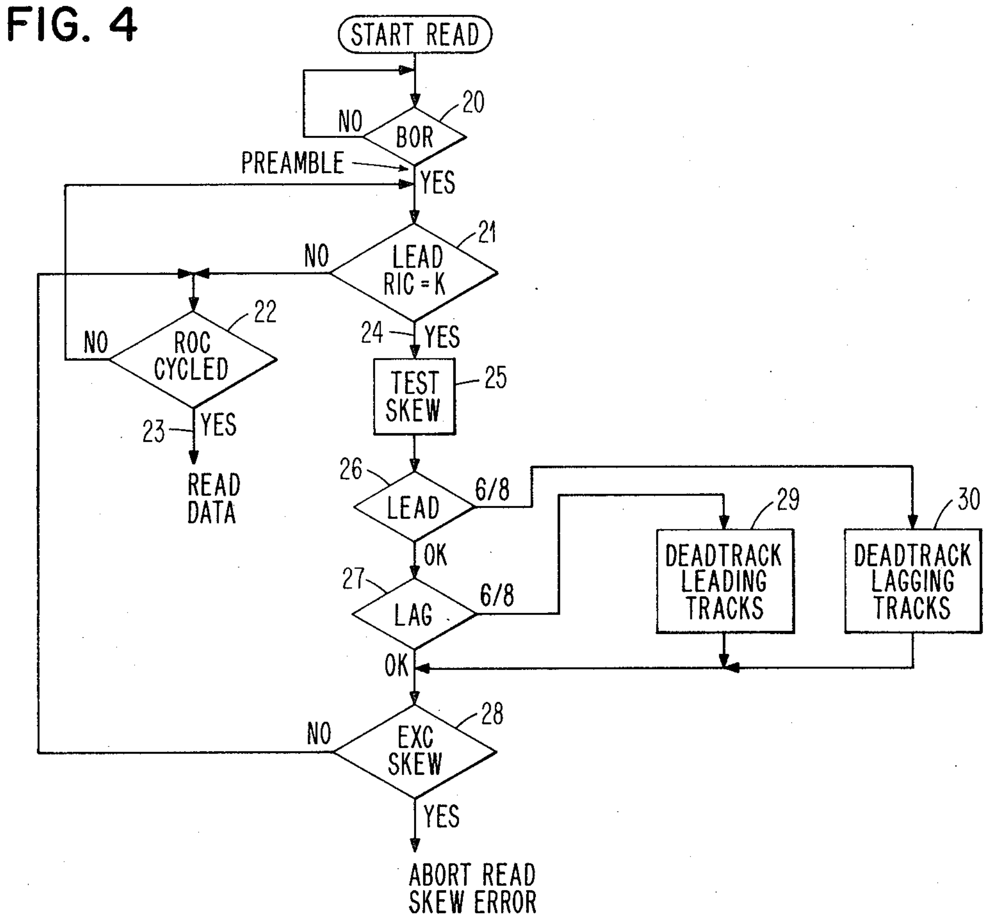
FIG. 4 is an extremely simplified logic flowchart showing the operation of the invention as could be practiced with the FIGS. 2 and 3 illustrated apparatus.

Readback operations of a digital magnetic recorder are fully described in the Irwin Patent '534. The flowchart of FIG. 4 is designed to illustrate how to practice the present invention in connection with the teaching of Irwin '534 as used in conjunction with the Hinz, Jr., patented system '900.

Upon the start of a read operation, the tape is moving; and the readback circuits are scanning the media for beginning of record (BOR) as shown by the decision wait loop 20. Upon detection of BOR, the preamble is being read back for forward read and postamble for backward read. The I/O controller, such as shown in Irwin '617, recycled its microprograms through two-step instruction test loop consisting of branch instruction 21 for detecting when any RIC = K (K=14, PE; K=26, RLL, marginal skew) and branch instruction 22 which detects whenever the ROC of SKB 57 has cycled (assembled one group of readback signals). If the branch in instruction 22 becomes true, it signifies that all of the channels are operating properly; and data can be successfully read back as indicated by the read data legend at 23. If ROC has not cycled, the test loop 21, 22 is re-entered until either branch is made true.

If branch instruction 21 becomes true (marginal skew condition) then test skew procedure is entered at 24. This action corresponds to AND circuit 295 of FIG. 3 setting the latches 290 or 284 for initiating deadtracking operation prior to completion of deskewing one group of data signals. Test skew step 25 corresponds to actuation of vote circuits 294. In FIG. 3, vote circuits 294 are continuously operating. However, in a programmed version of the invention, such operation will be sequential and needs initiation as by instruction at 25 supplying an activating signal to vote circuit 294, for example, such as shown in the Irwin patent '617 for generating signal transfers.

Steps 26 and 27 test for lead or lag conditions and correspond to setting the latches 284 and 290 by the respective A1 input portions. If there is no excessive leading or lagging signals, the excessive skew test is made at 28. This corresponds to detection of excessive skew by compare circuits 270. If there is excessive skew, the read operation is aborted, with the system signalling a skew error to the controlling data processor. If there is no excessive skew, then the test loop 21, 22 is again re-entered.

Deadtrack initation during the first phase of skew testing is performed respectively by steps 29 and 30 for the leading and lagging tracks. This action corresponds respectively to the A1 input portions of DTL's 283 for lagging and the A2 input portions of DTLTL's 283 for leading, as has been described.

While the invention has been particularly shown and described with reference to a preferred embodiment thereof, it will be understood by those skilled in the art that various changes in form and detail may be made therein without departing from the spirit and scope of the invention.

What is claimed is:

1. An improved magnetic recording/readback system operable with a multitrack magnetic member;

a plurality of channels respectively associated with tracks in said multitrack media, each channel including independent self-clocking readback and detection means for supplying data signals recovered from the respective tracks in asynchronous relationship to each and every other channel;

first means in each of said channels for indicating start of readback signals;

deskewing means receiving signals from each said channel and having a given number of deskewing positions, independent means in said deskewing means operatively associated with each of the respective channels for receiving signals therefrom and indicating relative positions thereof in said deskewing means with respect to other received signals from other tracks, and common means in said deskewing means responsive to said independent means for supplying aligned output signals from all of said channels;

first monitor means associated with said independent and common means for detecting the difference between any one of said independent means and said common means which exceeds the deskewing capacity of said deskewing means by indicating a difference having a predetermined relationship to said given number for indicating an excessive skew condition;

the improvement including in combination:

stepping means in each said independent means responsive to said start of data signal to step said independent means in accordance with bit periods established by the respective self-clocking means;

test initiating means responsive to any of said stepping means having stepped a predetermined number of bit periods after said start of data to supply a test skew signal;

comparison means responsive to any one of said test skew signals for comparing all of said independent means and said common means for indicating the respective deskewing condition of said deskewing means for determining that a given number of said independent means has a leading or lagging condition in said deskewing means with respect to a number of said independent means less than said given number;

means responsive to said comparison means to inhibit transfer of signals from any of said desired ones of said plural channels for transferring signals to said deskewing means, and further operative to inhibit said independent means from actuating said common means to supply output signals from said deskewing means independent of said detected ones channels; and control means responsive to said common means being operated to inhibit operation of said comparison means.

2. The system set forth in claim 1 further including means responsive to said first means to indicate beginning of record (BOR) when a preset number of said first means indicates beginning of readback signals, the improvement further including in combination:

means selectively inhibiting each said stepping means and means responsive to said BOR indication to initiate all said stepping means.

3. A start read and record circuit for a digital signal magnetic recorder adapted to operate with a multitrack record media having signal preambles in each track preceding recorded data signals;

means detecting and indicating beginning of record in a predetermined number of said tracks, means associated with each record track detecting and indicating beginning of data signals following the respective preamble signals, means associated with each track counting data signals recovered from each track, respectively;

deskew means indicating readback from all said record tracks;

the improved start read circuit including in combination:

first means detecting that a given number of data signals has been transferred from any one of said record tracks;

second means responsive to said first means for comparing the number of signals read from all said record tracks, and indicating whether or not a predetermined difference exists between said number of signals;

third means responsive to said predetermined difference to indicate a possible error condition;

deadtrack means jointly responsive to said indicated possible error condition and said counts to selectively inhibit transfer of signals from a selected record track; and fourth means responsive to said deskew means to inhibit operation of said third means.

4. The start read circuit set forth in claim 3 wherein said deadtrack means includes voting means indicating whether a given majority of said readback signals leads or lags the remaining ones of said readback signals by a given number of signals and means in said deadtrack means deadtracking said tracks yielding said remaining readback signals.

5. The start read circuit set forth in claim 3 further including pointer signal means selectively supplying pointer signals indicating a possible signal error condition in signals from any of said record tracks;

marginal skew means responsive to said counting means to indicate count differences representing almost-excessive skew between readback signals;

voting means indicating whether a given majority of said readback signals leads or lags remaining ones of said readback signals; and deadtrack indicating means in said deadtrack means jointly responsive to said pointer signals, said marginal skew means, and said voting means to selectively deadtrack signals from selected tracks.

6. The start read circuit set forth in claim 5 wherein said deadtrack initiating means includes means jointly responsive to said deskew means, said pointer signals, and said marginal skew means to indicate deadtracking for those record tracks respectively associated with said pointer signals.

7. The start read circuit set forth in claim 5 including means indicating a given skew condition for each said readback signal; and said deadtrack initiating means including means receiving said given skew indications for any of said tracks as pointer signals whenever said voting means indicates most tracks are leading.

8. The method of initiating the readback of signals from a multitrack record member having aligned synchronization portions and data signal portions in each track, the improved method including the steps of:

simultaneously sensing synchronization portion signals from all tracks and attempting to independently synchronize readback circuit operation thereto for each of said tracks;

independently for each track attempting to determine beginning of each said data signal portion and indicating such status, comparing the status indications for all said tracks for said beginning of data portions; detecting which of said indications represent a time of detection of a beginning of data portion within a preset time range and which of said indications represent a time of detection of a beginning of data portion with a predetermined time difference from said preset time range; and deadtracking those readback circuits for tracks having a beginning of data determination status indication with said predetermined time difference relationship to other ones of said status indications.

* * * * *

PO-1050
(5/69)

UNITED STATES PATENT OFFICE
CERTIFICATE OF CORRECTION

Patent No. 3,812,531 Dated May 21, 1974

Inventor(s) Phil H. Hall

It is certified that error appears in the above-identified patent and that said Letters Patent are hereby corrected as shown below:

Column 10, line 61, "parity)" should read --8--.

Column 12, line 34, "recynchronization" should read --resynchronization--.

Column 15, line 61, "desired" should read --detected--.

Signed and sealed this 3rd day of December 1974.

(SEAL)
Attest:

McCOY M. GIBSON JR.
Attesting Officer

C. MARSHALL DANN
Commissioner of Patents